Dec. 31, 1929.  J. F. O'CONNOR  1,741,650
FRICTION SHOCK ABSORBING MECHANISM
Filed July 23, 1927   2 Sheets-Sheet 2
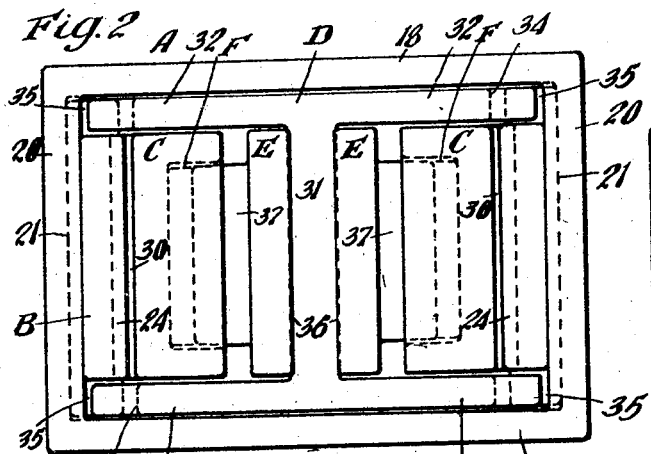
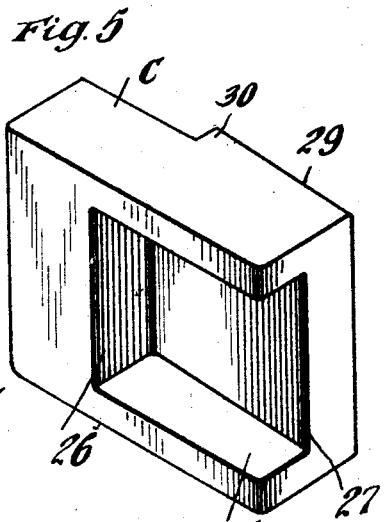
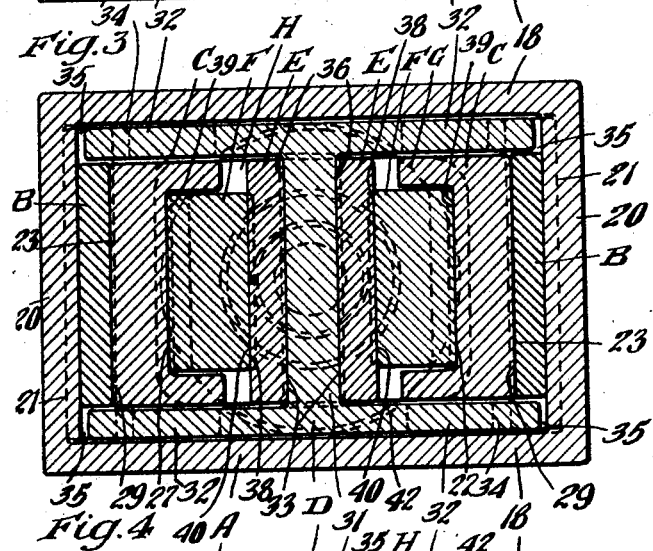
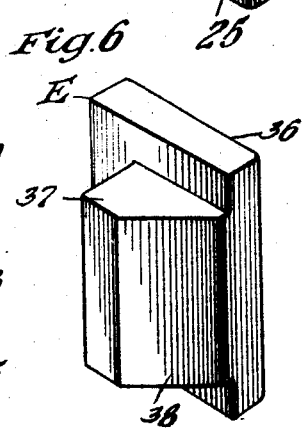
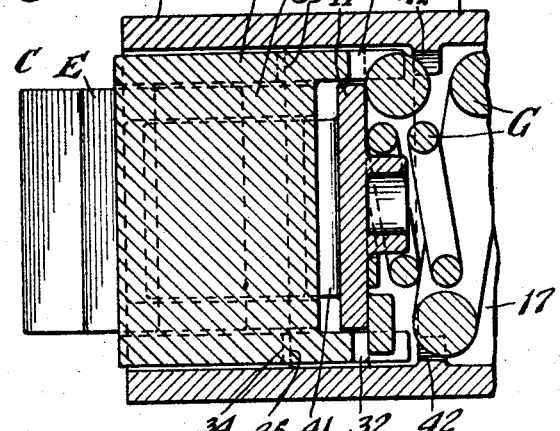
Inventor
John F. O'Connor
By George I. Haight
His Atty
Witness
Wm. Geiger Patented Dec. 31, 1929

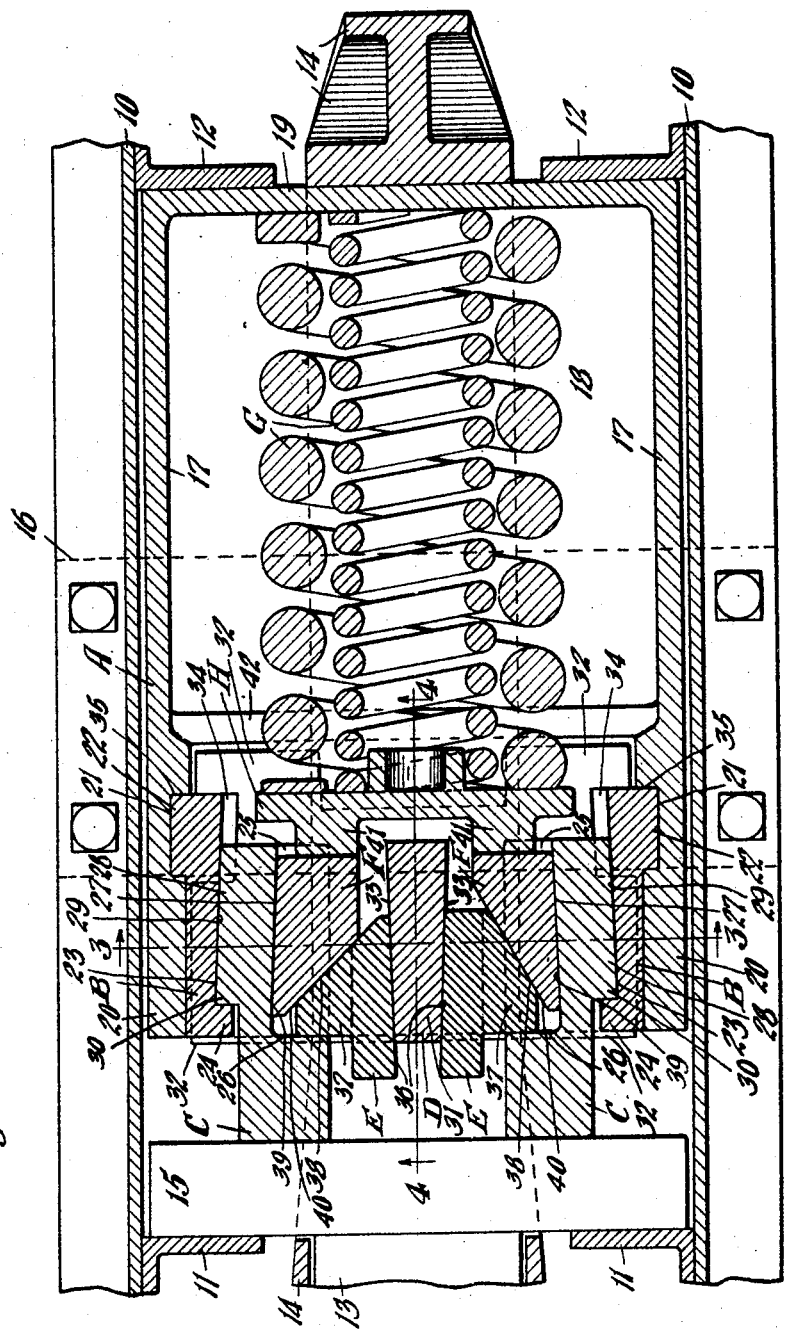

1,741,650

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed July 23, 1927. Serial No. 207,947.

This invention relates to improvements in friction shock absorbing mechanisms.

One object of the invention is to provide a friction shock absorbing mechanism of high capacity, especially adapted for railway draft riggings, including a friction system cooperating with a friction shell wherein a central friction member is also provided which cooperates with the friction system, thus providing a plurality of friction surfaces of relatively large area with resultant increased capacity.

A further object of the invention is to provide a shock absorbing mechanism of the character indicated including a friction shell, a central friction post and pressure transmitting friction members together with a differential wedge syestem interposed between the friction post and the pressure transmitting friction members.

Another object of the invention is to provide a friction shock absorbing mechanism including a friction shell provided with detachable liners, a friction post, and friction means cooperating with the post and liners to produce high frictional capacity together with retaining means for anchoring the post to the detachable liners wherein the retaining means also serves the purpose of protecting the inactive surfaces of the walls of the friction shell from wear.

Other objects and advantages of the invention will more clearly appear from the description and claims hereinafter following.

In the drawings forming a part of this specification, Figure 1 is a horizontal, longitudinal sectional view of a portion of a railway draft rigging showing my improvements in connection therewith. Figure 2 is a front end elevational view of the shock absorbing mechanism proper. Figure 3 is a transverse, sectional view corresponding substantially to the line 3—3 of Figure 1. Figure 4 is a longitudinal, vertical sectional view of the forward end portion of the shock absorbing mechanism, corresponding substantially to the line 4—4 of Figure 1. And Figures 5 and 6 are detail perspective views of one of the pressure transmitting members and one of the wedge blocks, respectively, employed in connection with my improved mechanism.

In said drawings, 10—10 indicate channel shaped center or draft sills of a railway car underframe to the inner sides of which are secured the usual front stop lugs 11—11 and rear stop lugs 12—12. The rear end portion of the draw bar is designated by 13. A yoke 14 of well known form is operatively connected to the draw bar. The shock absorbing mechanism proper as well as a front main follower 15 are disposed within the yoke, the yoke in turn being operatively supported by a detachable saddle plate 16 secured to the draft sills.

My improved shock absorbing mechanism proper comprises broadly a casing A; a pair of detachable liners B—B secured to the casing walls; two pressure transmitting friction elements C—C; a central friction post D; two wedge friction blocks E—E; two wedge blocks F—F; a main spring resistance G; and a spring follower H.

The casing A is in the form of a generally rectangular box-like member having spaced longitudinally disposed vertical side walls 17—17, horizontally disposed spaced top and bottom walls 18—18 and a transverse rear end wall 19. The end wall 19 cooperates with the stop lugs 12 in the manner of the usual rear follower. As most clearly shown in Figure 1, the casing is open at the front end and the side walls adjacent the open end of the casing are inwardly thickened, as indicated at 20. The thickened sections of the side walls are vertically grooved, as indicated at 21, the grooves being spaced rearwardly of the front end of the casing and being in transverse alignment. The grooves 21 serve as seats to receive anchoring means on the liners to hold the latter against movement longitudinally of the casing.

The liners B, which are two in number, are disposed at opposite sides of the mechanism. Each liner is in the form of a thick heavy rectangular plate having a lateral enlargement 22 at the rear end thereof. The enlargements 22 of the liners B are seated in the grooves 21, thus serving as anchoring means for the liners. On the inner side, each liner has a flat longitudinally extending friction surface 23. As will be clear upon reference to Figure 1, the friction surface 23 of the opposed liners converge inwardly of the mechanism. At the forward end, each liner B is provided with an inwardly extending vertically disposed abutment rib 24, which serves to limit the outward movement of the corresponding pressure transmitting friction element C.

The pressure transmitting friction elements C are of similar design and cooperate with the liners B. Each pressure transmitting friction element has a flat front end face which bears directly on the inner side of the main follower 15. At the rear end the inner side of the friction element C is recessed, as indicated at 25, thereby providing channel shaped sections having a transverse flat front abutment wall 26. The back wall of the recessed section is designated by 27. As clearly shown in Figures 1 and 5, the wall 27 is flat and is inclined with respect to the longitudinal axis of the mechanism so that the opposed walls 27 of the two pressure transmitting friction elements C present inwardly converging friction surfaces.

The friction surfaces 27 may either be disposed parallel to the friction surfaces 23 of the corresponding liners or may be disposed at an inclination differing therefrom. At the rear portion each friction element C is laterally enlarged on the outer side, as indicated at 28, the enlargement 28 presenting an outer flat friction surface 29, which cooperates with the friction surface 23 of the corresponding liner B. At the forward end the enlargement 28 presents a transverse abutment shoulder 30 which cooperates with the rib 24 of the corresponding liner to positively limit outward movement of the pressure transmitting friction element C.

The central friction post D comprises a vertically disposed relatively heavy plate-like section 31 and top and bottom horizontally disposed plate-like flange members 32—32 laterally projecting therefrom. The section 31 of the post D is preferably tapered, the faces on the opposite sides thereof diverging rearwardly of the mechanism. The side faces of the post are designated by 33 and serve as friction surfaces which cooperate with the wedge friction blocks E—E. The plate-like top and bottom flange members 32 extend substantially the entire width of the friction casing and have their opposite sides notched, as indicated at 34. The notched portions 34 are adapted to receive lugs 35—35 at the top and bottom sides of the liners B, the liners B being cut away forwardly of the lugs 35 to accommodate the front portion of the plate-like flange member 32. As clearly shown in Figure 1, the cut away portions or recesses 34 of the flanges 32 are of greater length than the lugs 35 and also of greater width than the same, thereby providing a certain amount of clearance between these parts. It will be evident that by providing this clearance a certain amount of movement of the post D longitudinally of the mechanism is permitted. By providing this limited movement for the post a preliminary action of the mechanism is had, as hereinafter more fully explained.

The wedge blocks E—E are disposed at opposite sides of the post D and are of similar design. Each wedge block E has a longitudinally extending flat friction surface 36 on the inner side thereof cooperating with the friction surface 33 at the same side of the post. The wedge blocks E are laterally enlarged as indicated at 37, the enlargements 37 presenting transverse flat front abutment faces cooperating with the abutment faces 26 of the pressure transmitting elements C. The enlargement 37 of each wedge block E is also provided with an inner wedge face 38 adapted to cooperate with the wedge block F at the same side of the mechanism. Upon reference to Figure 6, it will be seen that the main body portion of each wedge block E is of plate-like form and the lateral enlargement 37 of the block is of lesser height than the plate-like body portion. The enlargement 37 of each wedge block E is of such a height as to be freely accommodated within the opening 25 of the corresponding pressure transmitting friction element C.

The wedge blocks F—F are of similar design and are interposed between the wedge blocks E and the friction surfaces 27 of the pressure transmitting friction elements C. Each wedge block F has a flat outer friction surface 39 which cooperates with the inner friction surface 27 of the corresponding element C. On the inner side each block F has a wedge face 40 which cooperates with and is correspondingly inclined to the wedge face 38 of the wedge block E at the same side of the mechanism. At the rear end the wedge block presents a flat transverse abutment face which cooperates with the spring follower H. As will be clear upon reference to Figure 3, the wedge blocks F are of such a size as to be loosely accommodated within the cut away portions 25 of the pressure transmitting friction elements C.

The main spring resistance G, which is disposed within the casing A, comprises a relatively light inner coil and a heavier outer coil, the coils having their opposite ends bearing respectively on the end wall 19 of the casing A and on the inner side of the spring follower H.

The spring follower H, which is interposed between the spring resistance G and the wedge blocks F—F, is in the form of a disc having forwardly projecting spaced arms 41 which bear directly on the inner ends of the friction blocks F. On the rear side, the spring follower H is provided with a central boss which extends into the inner coil of the spring resistance G thereby preventing relative lateral displacement of the spring follower and the spring resistance. It is pointed out that the arms 41 which are provided on the spring follower H serve to space the main body portion of the spring follower from the inner end of the friction post and the pressure transmitting friction elements C, thereby permitting the necessary movement of the parts to compensate for wear of the various friction and wedge faces of the mechanism. The main spring resistance is preferably placed under initial compression when the mechanism is assembled so that the tendency of the spring resistance to expand will at all times hold the various wedge and friction surfaces of the mechanism in intimate contact.

Means is also provided for positively limiting the inward movement of the post D, this means comprising top and bottom transverse interior ribs 42 on the top and bottom walls of the casing A. As clearly illustrated in Figures 1 and 4, the ribs 42 present transverse abutment faces extending inwardly across the casing, which cooperate with the inner edges of the flange-like sections 32 of the post D. In the normal position of the parts the flange sections 32 of the post D are spaced from the ribs 42, thus permitting a certain amount of relative movement between the post and the casing during the initial compression of the mechanism.

In assembling my improved mechanism the main spring resistance G together with the spring follower H are first inserted within the casing A. The friction mechanism including the post D, wedge blocks E—E; wedge blocks F—F; pressure transmitting elements C—C and the liners B—B are assembled as a unit. The assembled unit is then entered through the open front end of the casing A, the parts being laterally compressed so that the enlargements 22 at the inner ends of the liners B will freely pass the side walls of the casing. The necessary lateral inward displacement of the liners to accomplish this result is accommodated by the clearance of the recesses 34 of the flange sections 32 of the post D. The assembled unit is forced into the casing until the enlargements 22 of the liners are in alignment with the grooves 21, whereupon the unit is permitted to expand thereby seating the enlargements in the grooves and anchoring the liners against movement longitudinally of the casing A. Due to the tendency of the main spring resistance G to expand, the liners will be maintained in seated relation with the side walls of the casing on account of the wedging action between the wedge blocks E and F.

The operation of my improved shock absorbing mechanism assuming a compression stroke is as follows: The main follower 15 and the casing A will be moved relatively toward each other thereby forcing the pressure transmitting friction elements C inwardly of the casing. During this action the wedge blocks E will also be forced inwardly of the casing, thus setting up a wedging action between the latter and the wedge blocks F which are resisted in their movement by the main spring G. The friction elements C—C will thus be forced into intimate contact with the liners B and the friction surfaces of the blocks E and F will be forced into intimate contact with the friction surfaces of the post D and the friction elements C—C, respectively. Due to the friction created between the post D and the wedge blocks E, the post will be forced to move inwardly with the wedge blocks E during the initial portion of the compression stroke. As inward movement of the parts continues, the inner edges of the flange-like sections 32 of the post D will be brought into engagement with the ribs 42 of the casing A, thus positively limiting movement of the post D. Upon movement of the post D being arrested, the wedge blocks E will be forced to slip on the friction surfaces of the post, while, at the same time, the friction surfaces of the elements C will also slip on the friction surfaces of the liners B. During the described compression of the mechanism, due to the taper of the friction post D and the inward convergence of the friction surfaces of the liners B, a differential action will be had, thereby causing slippage between the cooperating wedge faces of the wedge blocks E and F and compelling the wedge blocks F to slip inwardly on the friction surfaces 27 of the friction elements C. Due to the differential action just described, the spring follower H will be advanced more rapidly than the pressure transmitting element C, thereby effecting increased compression of the main spring resistance G. The described action will continue either until the actuating force is reduced or until the main follower 15 engages the front end of the casing A, whereupon the pressure will be transmitted directly through the casing A to the stop lugs of the draft sills, the casing acting as a column load transmitting member to prevent the main spring G from being compressed.

During release of the mechanism, when actuating force is reduced, the expansive action of the spring G will cause the wedge blocks F to be forced outwardly, thereby carrying the wedge blocks F and pressure transmitting elements C outwardly also. The initial release of the mechanism is facilitated by the initial movement of the post D which is permitted by the clearance provided between the anchoring flange members 32 and the lugs 35 of the liners B. The lugs 35 of the liners B will positively limit outward movement of the flange-like anchoring members 32 of the post D, thereby arresting the movement of the post. Outward movement of the pressure transmitting elements C is positively limited by cooperating shoulders 30 and ribs 24 of the elements C and liners B respectively. The pressure transmitting elements C in turn will positively limit outward movement of the wedge blocks E and F by engagement of the blocks E with the abutment shoulders 26 of the friction elements C.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a tapered friction shell; of pressure transmitting friction elements cooperating with the shell; a central friction member; cooperating wedge members interposed between the central friction member and the pressure transmitting friction elements, certain of said wedge members having shouldered engagement with the pressure transmitting friction elements and moved directly by said elements and in unison therewith, and having wedging engagement with the remaining wedge members, all of said wedge members being movable relatively to the central member inwardly of the mechanism; and spring-resistance means opposing inward movement of the wedge members.

2. In a friction shock absorbing mechanism, the combination with a casing provided with opposed interior internally converging friction surfaces; of pressure transmitting members having frictional engagement with said surfaces; a central friction member; wedge blocks having shouldered engagement with said pressure transmitting members to effect movement of said wedge blocks inwardly of the mechanism in unison with said pressure transmitting members; wedge blocks having wedging engagement with said first named wedge blocks, certain of the wedge blocks having frictional engagement with the central member and movable relatively thereto, and the remaining wedge blocks and pressure transmitting members having cooperating flat engaging friction surfaces extending lengthwise of the mechanism; and means yieldingly opposing movement of all of said wedge blocks.

3. In a friction shock absorbing mechanism, the combination with a casing having interior friction surfaces; of pressure transmitting members having friction surfaces cooperating with said shell friction surfaces; a central friction member; wedge friction members actuated by said pressure transmitting elements; said wedge friction members being movable relative to the central friction member and having frictional engagement therewith, additional wedge blocks interposed between the pressure transmitting members and first named blocks and having wedging engagement with the latter; and spring resistance means opposing movement of said additional wedge blocks inwardly of the mechanism.

4. In a friction shock absorbing mechanism, the combination with a casing having interior friction surfaces converging inwardly of the mechanism; of pressure transmitting members having friction surfaces cooperating with the shell friction surfaces; a central friction post; wedge elements actuated by said pressure transmitting elements, said wedge members being movable relatively to the central friction post and having frictional engagement therewith; wedge blocks interposed between said first named wedge blocks and the pressure transmitting members and having wedging engagement with said first named wedge blocks, said additional wedge blocks and pressure transmitting members having cooperating friction surfaces; and spring resistance means opposing movement of said additional wedge blocks inwardly of the mechanism.

5. In a friction shock absorbing mechanism, the combination with a casing having interior friction surfaces converging inwardly of the mechanism; of pressure transmitting members having friction surfaces cooperating with said shell friction surfaces; a central friction member; wedge friction elements actuated by said pressure transmitting members, said wedge friction members being movable relatively to the central friction member and having frictional engagement therewith; additional wedge blocks interposed between the pressure transmitting members and first named wedge blocks and having wedging engagement with the latter, said additional blocks and pressure transmitting members having cooperating friction surfaces converging inwardly of the mechanism; and means yieldingly opposing movement of said additional wedge blocks inwardly of the mechanism.

6. In a friction shock absorbing mechanism, the combination with a friction shell; of a central friction member within the shell, said shell and central friction member having a lost motion connection arresting relative movement thereof before full compression of the mechanism; a friction system movable with respect to the shell and central friction member, said system including a pressure transmitting friction member and a plurality of cooperating wedge members, said pressure transmitting member having frictional engagement with one of said wedge members and shouldered engagement with another of said wedge members for forcing the same inwardly of said friction member by said member, said wedge members having interengaging wedge faces; and means yieldingly opposing inward movement of said friction system.

7. In a friction shock absorbing mechanism, the combination with a friction shell; of a friction post within the shell, said post being provided with top and bottom plate-like sections formed integral therewith; wedge means interposed between the post and walls of the shell, said friction wedge means being also interposed between the top and bottom plate-like sections of the post; and spring resistance means within the shell cooperating with said wedge friction system.

8. In a friction shock absorbing mechanism, the combination with a casing; of liners attached to opposed walls of said casing, said liners and walls having inter-engaging cooperating means thereon for holding the liners against movement longitudinally of the casing; pressure transmitting elements having friction surfaces cooperating with the liners, said pressure transmitting elements and liners having inter-engaging means thereon for limiting outward movement of the pressure transmitting members; a central friction post; cooperating means on said post and said liners for limiting outward movement of said post; wedge friction members having frictional engagement with the post; cooperating abutment means on said pressure transmitting elements and wedge members to effect movement of the wedge members inwardly with the pressure transmitting elements and limit outward movement of the wedge members; additional wedge members having wedging engagement with said first named wedge members and frictional engagement with the pressure transmitting elements; and spring means within the casing cooperating with the wedge members.

9. In a friction shock absorbing mechanism, the combination with a friction shell provided with detachable liners; of a central friction member within the shell anchored to the liners; a friction system movable with respect to the shell and central friction member, said system including pressure transmitting friction members and a plurality of cooperating wedge members forced inwardly by said friction members, said pressure transmitting friction members being anchored to the liners and said wedge members being limited in their outward movement by pressure transmitting friction members; and means yieldingly opposing inward movement of said friction system.

In witness that I claim the foregoing I have hereunto subscribed my name this 20th day of July 1927.

JOHN F. O'CONNOR.